(12) United States Patent
Morello et al.

(10) Patent No.: US 11,608,895 B2
(45) Date of Patent: Mar. 21, 2023

(54) DISPENSING SEAL

(71) Applicant: Aptiv Technologies Limited, St. Michael (BB)

(72) Inventors: John Morello, Warren, OH (US); James M. Rainey, Warren, OH (US)

(73) Assignee: APTIV TECHNOLOGIES LIMITED, St. Michael (BB)

(*) Notice: Subject to any disclaimer, the term of this patent is extended or adjusted under 35 U.S.C. 154(b) by 3 days.

(21) Appl. No.: 17/083,729

(22) Filed: Oct. 29, 2020

(65) Prior Publication Data

US 2022/0136606 A1 May 5, 2022

(51) Int. Cl.
*F16J 15/20* (2006.01)
*H01R 13/52* (2006.01)
*F16J 15/3284* (2016.01)

(52) U.S. Cl.
CPC ........... *F16J 15/20* (2013.01); *F16J 15/3284* (2013.01); *H01R 13/5202* (2013.01); *H01R 13/5216* (2013.01)

(58) Field of Classification Search
CPC .......... F16J 15/02; F16J 15/021; F16J 15/022; F16J 15/06; F16J 15/10; F16J 15/102; F16J 15/104; F16J 15/20; F16J 15/3284; H01R 13/5202; H01R 13/521; H01R 13/5216
See application file for complete search history.

(56) References Cited

U.S. PATENT DOCUMENTS

| | | | | |
|---|---|---|---|---|
| 4,674,756 A * | 6/1987 | Fallon | ................... | B67D 1/0829 277/606 |
| 5,143,381 A * | 9/1992 | Temple | ................. | F16L 21/035 277/609 |
| 5,172,919 A * | 12/1992 | Takasaki | ............... | E21D 11/385 277/905 |
| 5,536,018 A * | 7/1996 | Szott | ...................... | F16J 15/104 277/313 |
| 6,739,599 B1 * | 5/2004 | Uchimura | ............... | B29C 48/21 428/31 |
| 6,966,559 B1 * | 11/2005 | Fischer | ................. | F16C 33/103 403/50 |
| 7,029,013 B2 * | 4/2006 | Yajima | ................... | F16J 15/104 277/637 |
| 7,159,874 B2 * | 1/2007 | Hosokawa | ............. | F16J 15/123 277/638 |

* cited by examiner

*Primary Examiner* — Gilbert Y Lee

(74) *Attorney, Agent, or Firm* — Billion & Armitage

(57) ABSTRACT

A dispensing seal includes a base seal comprised of a first material. The base seal includes at least a top surface and a bottom surface and a cavity defined therein, wherein the bottom surface includes an opening to the cavity. A second material is located within the cavity of the base seal, wherein a viscosity of the second material is less than a viscosity of the first material.

20 Claims, 6 Drawing Sheets

DISPENSING SEAL

BACKGROUND

The present invention relates generally to electrical connectors and in particular dispensing seals utilized in electrical connectors.

Seals are commonly utilized in electrical connectors to prevent debris, contaminants, and/or water from degrading performance of the electrical connector. A typical seal is comprised of a homogenous material compressed within a cavity. For example, an O-ring is a type of face seal that may be utilized in an electrical connector. However, in some applications the surface to be sealed is uneven (e.g., flexible printed circuit board characterized by ridges associated with the conductive traces). The material associated with typical seals is unable to properly seal around uneven surfaces. In some applications, this problem is addressed by injecting a less viscous material into the cavity after the connectors have been assembled. As a manufacturing step, this is costly and prevents the connectors from being disengaged and re-engaged. Therefore, it would be beneficial to develop a seal that can be utilized with uneven surfaces and does not add substantially to the cost of manufacturing.

SUMMARY

According to one aspect, a dispensing seal includes a base seal comprised of a first material, wherein the base seal has a top surface and a bottom surface and a cavity defined within the base seal. The bottom surface includes an opening to the cavity. The dispensing seal further includes a second material located within the cavity of the base seal, wherein a viscosity of the second material is less than a viscosity of the first material.

According to another aspect, a sealing assembly includes a housing, a component configured to interact with the housing, and a dispensing seal located between the housing and the surface to be sealed. The dispensing seal includes a base seal having a top surface, a bottom surface, and a cavity formed therein, wherein the cavity opens to the bottom surface of the dispensing seal. A second material is located within the cavity and is dispensed through the cavity opening and into contact with the surface to be sealed in response to compression of the dispensing seal.

DETAILED DESCRIPTION

According to some aspects, a dispensing seal is provided that can be utilized for sealing uneven surfaces. The dispensing seal includes a base seal comprised of a first material. A cavity is formed in the base seal that houses a second material, different from the first material. The cavity is open to a bottom surface (i.e., sealing surface) of the dispensing seal. The viscosity of the second material is selected to be less than the viscosity of the first material. When the dispensing seal is compressed, compression of the base seal causes the second material to flow or dispense through the opening on the bottom surface. One of the benefits of the dispensing seal is that the second material is capable of flowing around uneven surfaces associated with the surface to be sealed due to the lower viscosity of the second material (relative to the first material).

Figure 1:
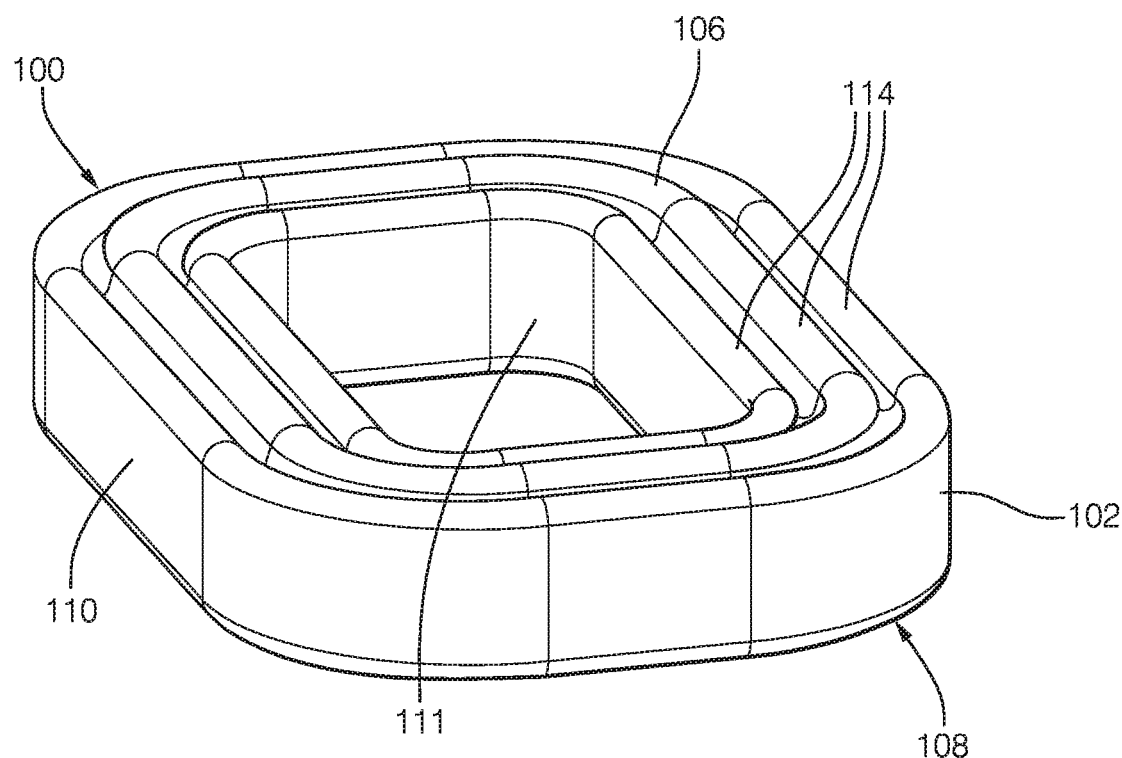
FIG. 1 is a perspective view of a dispensing seal according to some embodiments.
Figure 2:
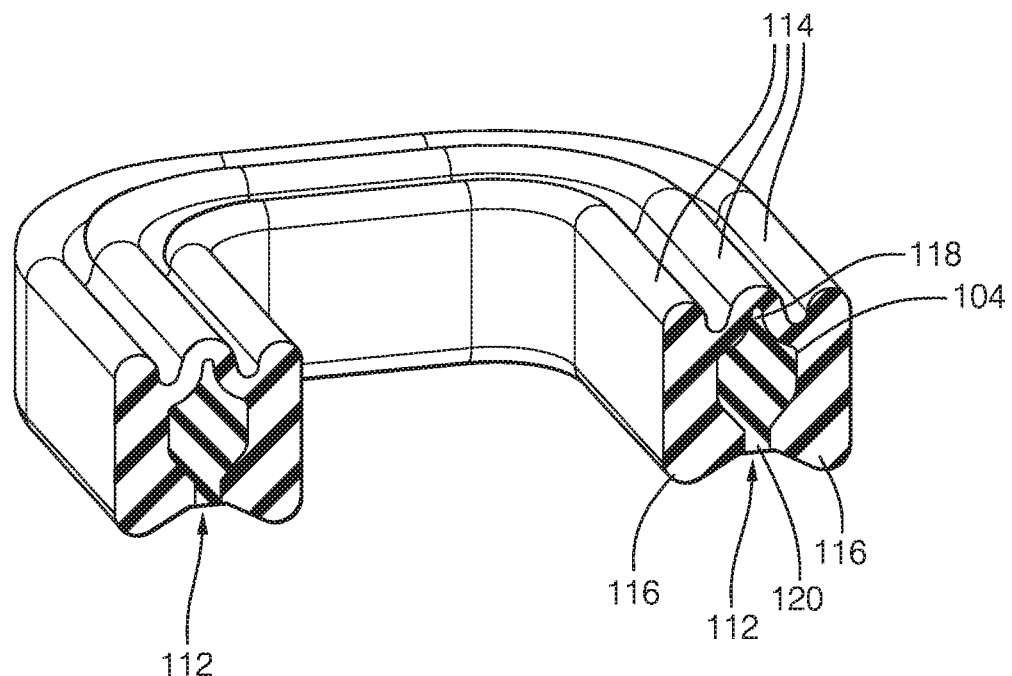
FIG. 2 is a cross-sectional view of the dispensing seal shown in FIG. 1 according to some embodiments.

Referring now to FIGS. 1 and 2, a dispensing seal 100 is provided according to some embodiments. FIG. 1 is a perspective view of a dispensing seal 100 and FIG. 2 is a sectional view of the dispensing seal 100. The dispensing seal includes a base seal 102 having a cavity in which a second material 104 (as shown in FIG. 2) is dispensed and retained. The base seal 102 includes a top surface 106, a bottom surface 108 (or sealing surface), an outer side surface 110 and an inner side surface 111. In the embodiment shown in FIG. 1, the dispensing seal is generally circular in shape. In other embodiments, various other geometries may be utilized (rectangular, linear, etc.) based on the surface to be sealed.

As shown in the sectional view shown in FIG. 2, the base seal 102 includes a cavity for retaining the second material 104 of the dispensing seal 100. In some embodiments, the cavity is open to the sealing surface of the dispensing seal 100. In the embodiment shown in FIG. 2, the cavity includes cavity opening 112 located on the bottom surface 108 of the dispensing seal 100.

The dispensing seal 100 relies on differences in viscosity between the base seal 102 and the second material 104. In some embodiments, the base seal 102 is comprised of a first material having first viscosity characteristics and the second material 104 having second viscosity characteristics, wherein the second material is more viscous than the first material. For example, in some embodiments the first material is comprised of rubber material such as silicone. In some embodiments, the second material 104 is comprised of a low durometer material or other material providing a lower viscosity relative to the first material. For example, in some embodiments the second material 104 is a low durometer silicone. In some embodiments, the second material 104 has a durometer of less than 1 shore. In some embodiments, the viscosity of the second material is selected such that the second material 104 is retained within the cavity of the base seal 102 prior to installation. During installation, the dispensing seal 100 is compressed by applying force between the top surface 106 and bottom surface 108. The compression of the dispensing seal 100 causes the second material 104 to dispense through the cavity opening 112 onto the surface to be sealed. For example, FIG. 2 illustrates the dispensing seal 100 in an uncompressed state. In this embodiment, the second material 104 is retained within the cavity. In response to compression of the dispensing seal 100, the second material 104 dispenses or flows through the cavity opening 112 and onto the surface to be sealed. The dispensing seal 100 shown in FIG. 1 may also be referred to as a face seal or O-ring seal, wherein the bottom surface 108 represents the sealing surface.

In the embodiment shown in FIG. 2, the geometry of the cavity includes a top or distal end 118, a main portion 119, and a bottom or proximal end 120. In some embodiments, the geometry of the cavity may be configured to aid in dispensing the second material 104 through the cavity opening 112 in response to compressive forces. For example, in the embodiment shown in FIG. 2 the proximal end 120 that is narrower than the main portion 119. Similarly, the distal end 118 is narrower and configured to extend vertically within one of the surface ridges 114 located on the top surface 106. Compressive forces applied between the top surface 106 and bottom surface 108 compresses the second material 104 and causes a portion of the second material 104 to dispense or flow through the cavity opening 112 onto the surface to be sealed.

In some embodiments, the base seal 102 includes surface ridges 114 and 116 located on the top surface 106 and bottom surface 108, respectively. In some embodiments, the surface ridges 114 located on the top surface 106 act to provide a sealing surface. For example, in applications in which the surface (not shown) that interacts with the top surface 106 is relatively even, then surface ridges 114 may provide adequate sealing. However, in applications in which the surface that interacts with the top surface 106 is also uneven, then it may be necessary to provide a secondary cavity opening (either to the same cavity as that shown in FIG. 2 or to a separate cavity) for dispensing the second material 104 to the uneven surface to be sealed. Likewise, in the embodiment shown in FIG. 2 the bottom surface 108 includes a pair of ridges 116 that extend away from the bottom surface 108. In some embodiments, ridges 116 also extend away (i.e., downward) from the cavity opening 112. Prior to compression, the ridges 116 contact the surface to be sealed (e.g., the uneven surface), and may act to prevent the second material 104 from coming into contact with the surface to be sealed. During compression, the ridges 116 are compressed, bringing the cavity opening 112 closer to the surface to be sealed and allowing the dispensed material (i.e., second material 104) to be brought into contact with the surface to be sealed.

In some embodiments, the second material 104 is dispensed or molded within the cavity of the base seal 102. However, the viscosity of the second material 104 is selected that the second material is retained within the cavity of the base seal 102 until compressive forces are applied to the base seal 102.

Figure 3A:
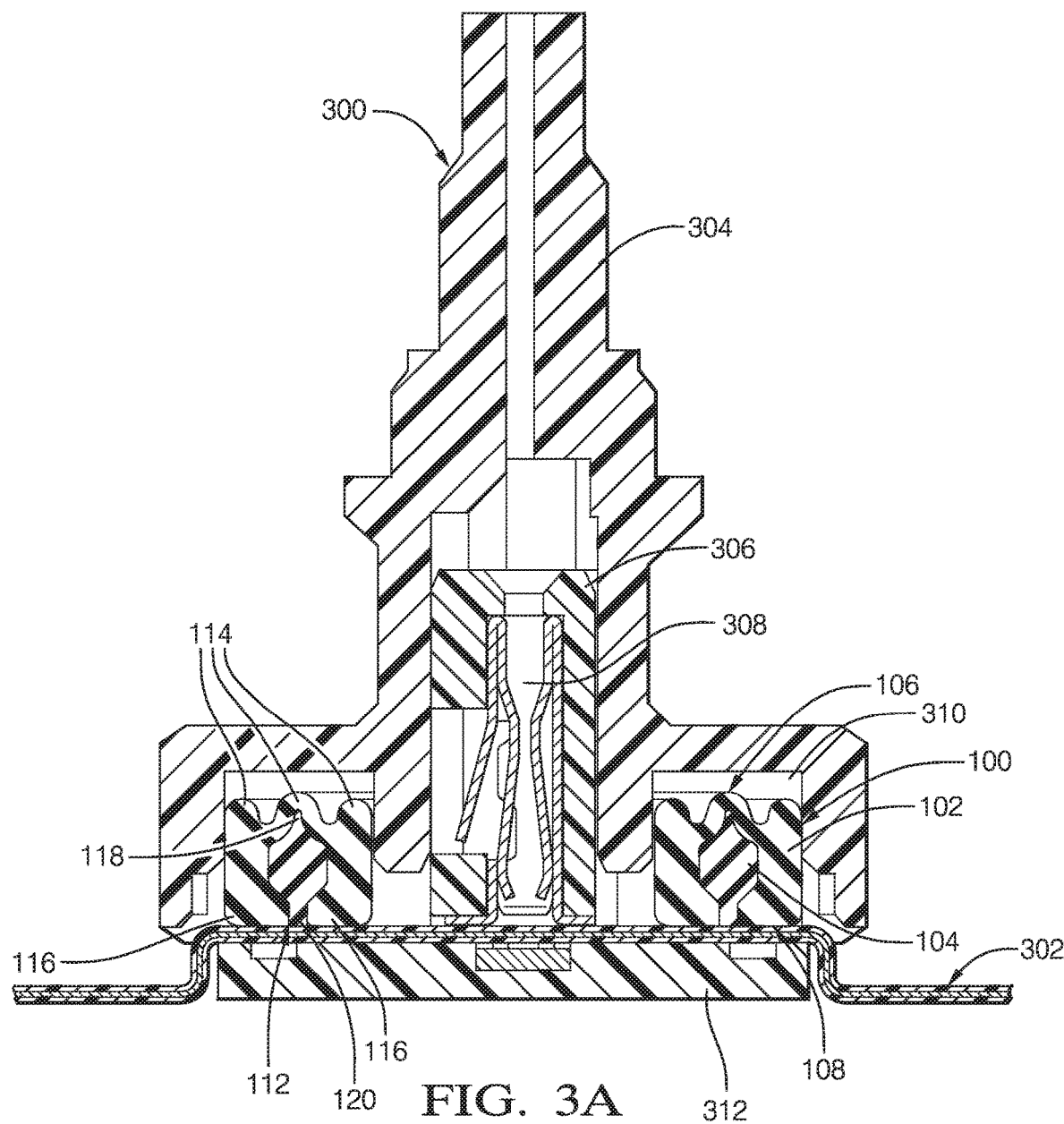
FIGS. 3A-3C are cross-sectional views of the dispensing seal installed within an assembly according to some embodiments.
Figure 3B:
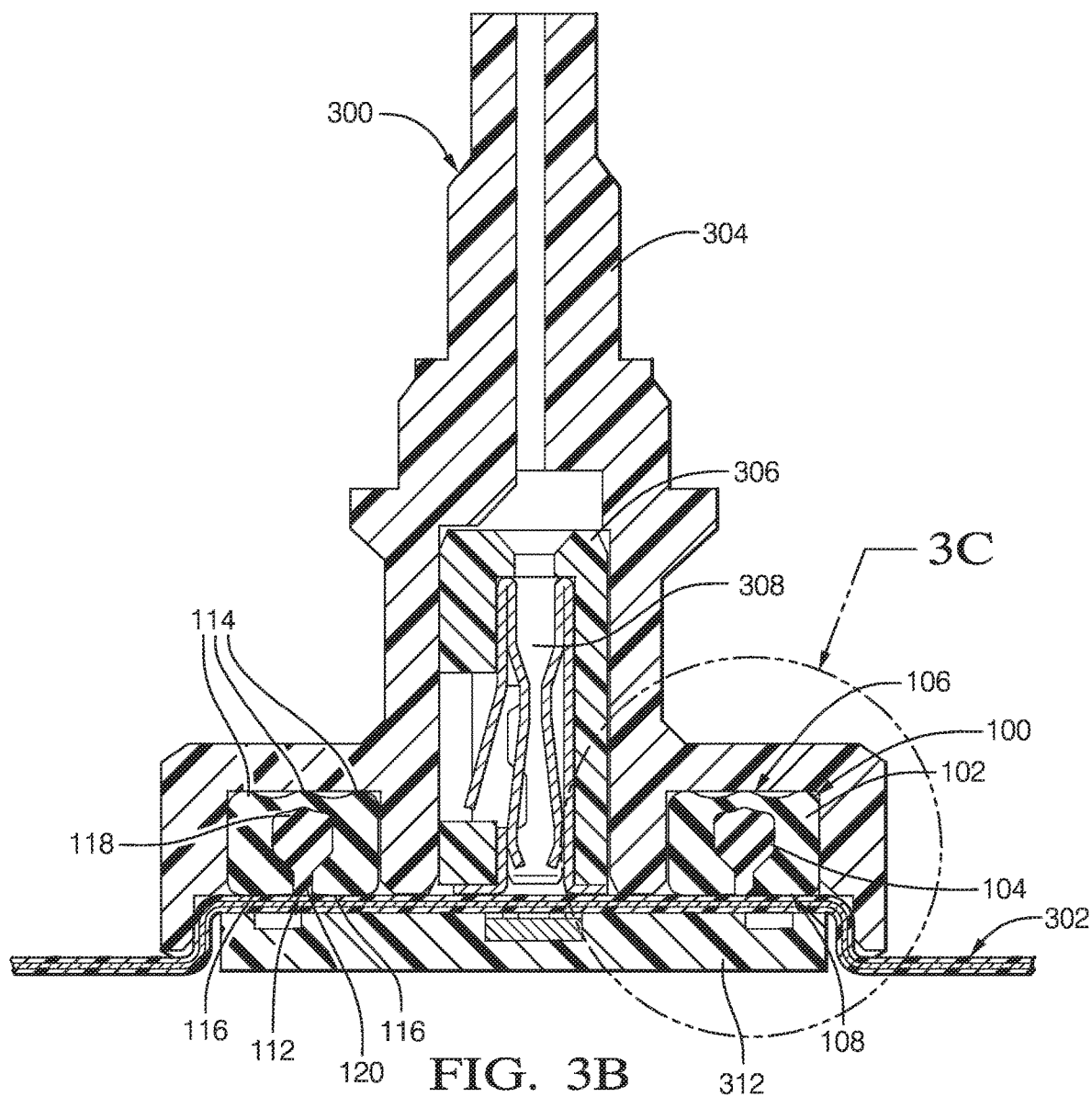
Figure 3C:
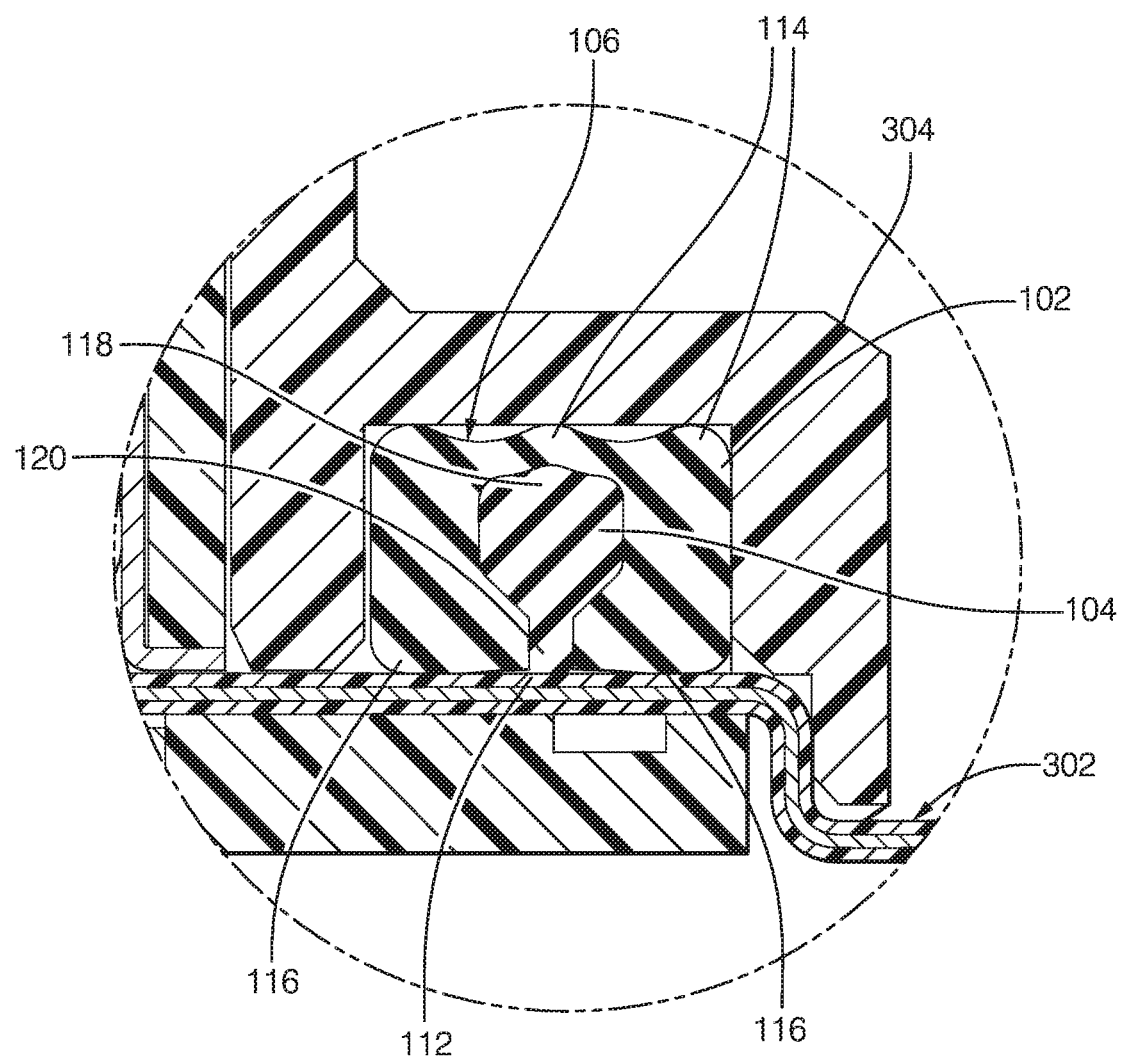

Referring now to FIGS. 3A-3C, the dispensing seal 100 is deployed within a connector assembly 300 according to some embodiments. In this example, a connector assembly 300 is being connected to a flexible printed circuit 302. FIG. 3A is a cross-sectional view that illustrates the dispensing seal 100 in an uncompressed state. FIG. 3B is a cross-sectional view that illustrates he dispensing seal 100 in a compressed state as the connector assembly 300 is brought into contact with the flexible printed circuit 302, and FIG. 3C is a magnified view of the dispensing seal 100 in the compressed state according to some embodiments.

In some embodiments, the connector assembly 300 includes a connector housing 304, an interconnect header 306, a surface mount terminal 308, and a seating cavity 310. The surface mount terminal 308 is utilized to make electrical contact with the flexible printed circuit 302. Although not visible in FIGS. 3A-3C, the flexible printed circuit 302 includes one or more conductive traces (not shown). The presence of the conductive traces results in the flexible printed circuit 302 having an uneven surface that is difficult to seal. In the embodiment shown in FIG. 3A, the dispensing seal is positioned within the seating cavity 310 with the bottom surface 108 positioned adjacent to the surface of the flexible printed circuit 302 (i.e., the uneven surface to be sealed). In this application, dispensing seal 100 is utilized to seal the surface between the flexible printed circuit 302 and the connector assembly 300 to prevent contaminants (e.g., water, dirt, etc.) from reaching the surface mount terminal 308. In the uncompressed state (shown in FIG. 3A), the second material 104 of the dispensing seal may or may not yet be in contact with the surface of the flexible printed circuit 302. Likewise, as shown in FIG. 3A, the surface ridges 114 located on the top surface 106 are not yet in contact with the connector assembly 300.

FIGS. 3B and 3C illustrate the dispensing seal 100 in a compressed state as connector assembly 300 is brought into further contact with the flexible printed circuit 302. In some embodiments, a mechanism (not shown) is utilized to secure the connector assembly 300 to the flexible printed circuit 302. As shown in FIG. 3C, in the compressed state surface ridges 114 are compressed as are ridges 116. As a result of these compressive forces, second material 104 is dispensed or flows through the cavity opening 112 and into contact with the top surface of the flexible printed circuit 302. In some embodiments, the ridges 116 act to retain the flow of the second material 104 in a lateral direction. As discussed above, because the viscosity of the second material 104 is less than the viscosity of the base seal 102, the second material 104 flows or dispenses through the cavity opening 112 in response to the compression of the base seal 102. Due to the viscosity of the second material 104, the material is allowed to flow around the uneven surfaces associated with the flexible printed circuit 302—thereby forming a better seal.

One of the benefits of utilizing the dispensing seal 100 in this type of application is that it dramatically reduces the manufacturing costs associated with the sealing process. The dispensing seal 100 is placed in the seating cavity 310 and the seal is formed by compressing the dispensing seal 100 against the surface to be sealed. For example, other solutions to sealing uneven surfaces associated with flexible printed circuits may include dispensing a sealant around the area to be sealed. However, this requires more expensive dispensing equipment. In addition, removal of the connector assembly 300 may result in destruction of the dispensed sealing material. The dispensing seal 100 may be used and re-used, with the second material 104 staying with the dispensing seal 100 when removed from a particular application. In this way, the dispensing seal 100 provides ease of manufacturing/assembling and further allows the dispensing seal 100 to be reused following removal of the connector assembly 300.

Although the dispensing seal 100 shown in FIGS. 3A-3C is utilized to seal an electrical terminal in contact with a flexible printed circuit, the dispensing seal 100 may be utilized in any number of sealing application or sealing assemblies. Likewise, while the dispensing seal 100 is well-suited for sealing uneven surfaces such as the flexible printed circuit shown in FIGS. 3A-3C, in other embodiments the dispensing seal 100 may be utilized to seal typical, relatively planar or even surfaces. Likewise, the dispensing seal 100 may be utilized in a variety of applications in which the goal is to create a seal with a surface.

Figure 4A:
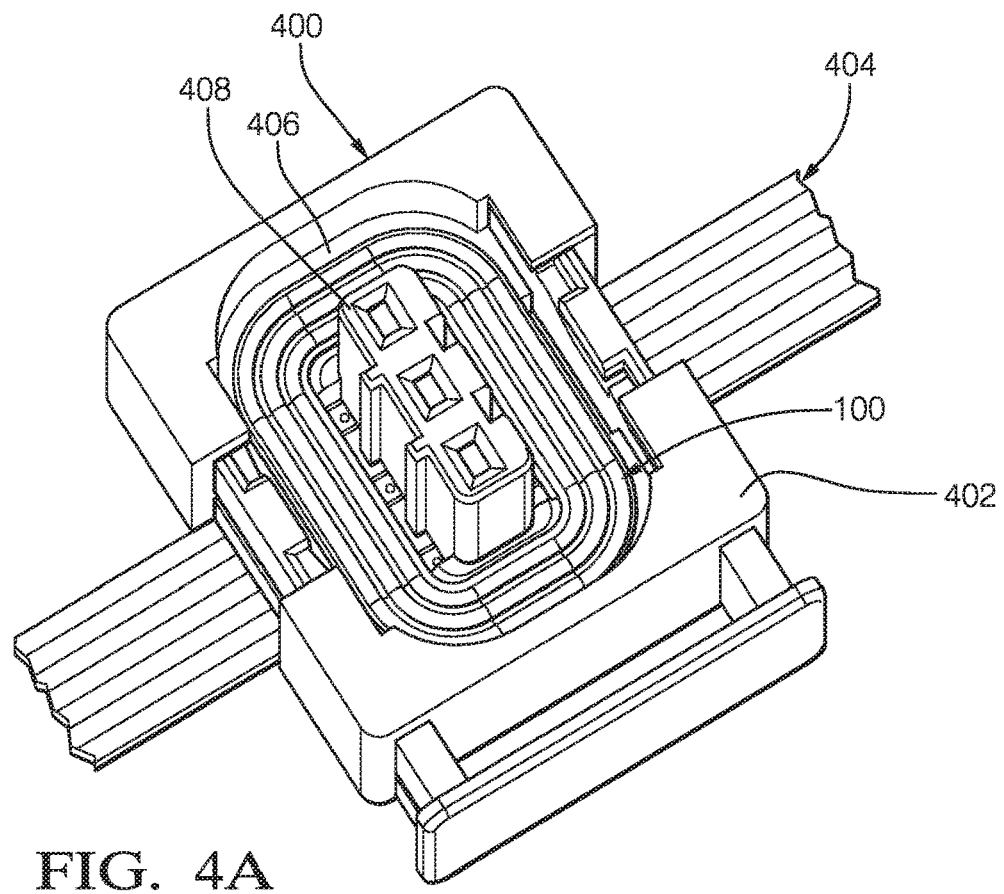
FIG. 4A is a perspective view of the dispensing seal installed within an assembly according to some embodiments.
Figure 4B:
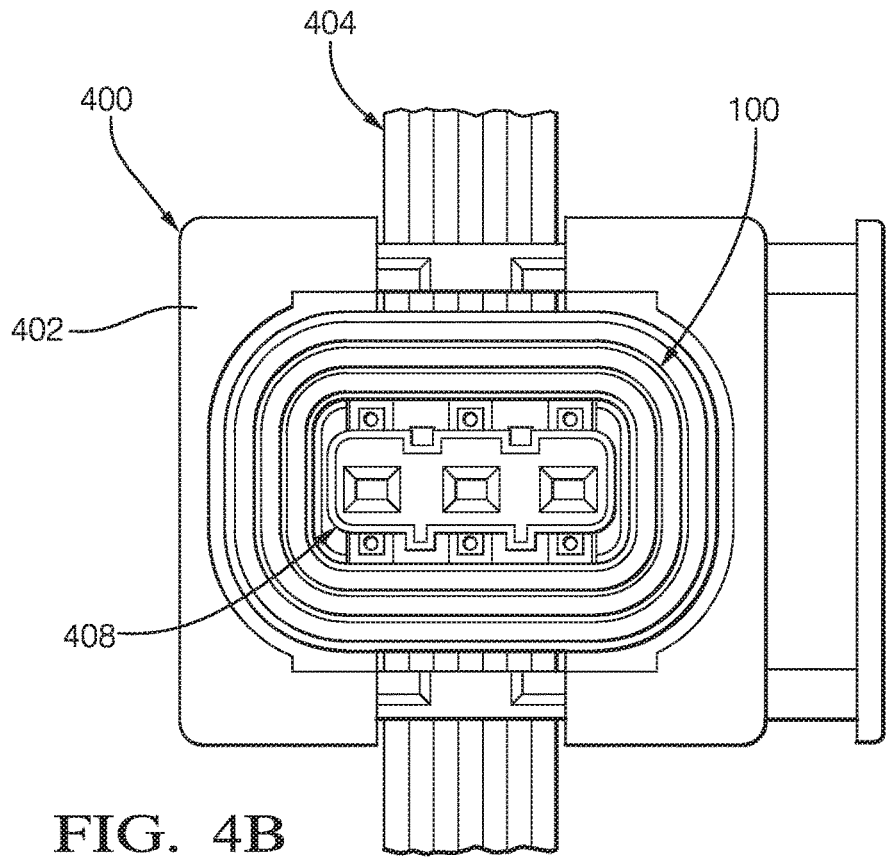
FIG. 4B is a top view of the dispensing seal installed within the assembly according to some embodiments.
Figure 4C:
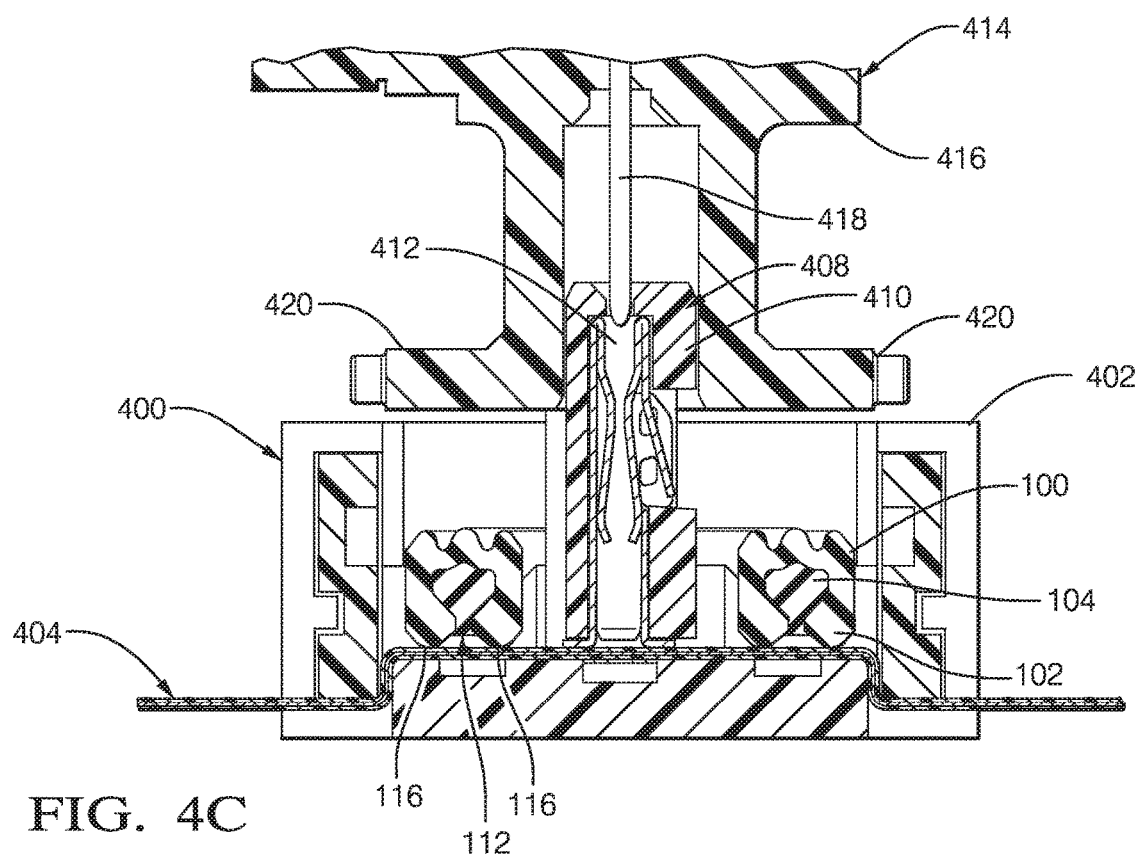
FIGS. 4C and 4D are cross-sectional views of the dispensing seal installed within the assembly according to some embodiments.
Figure 4D:
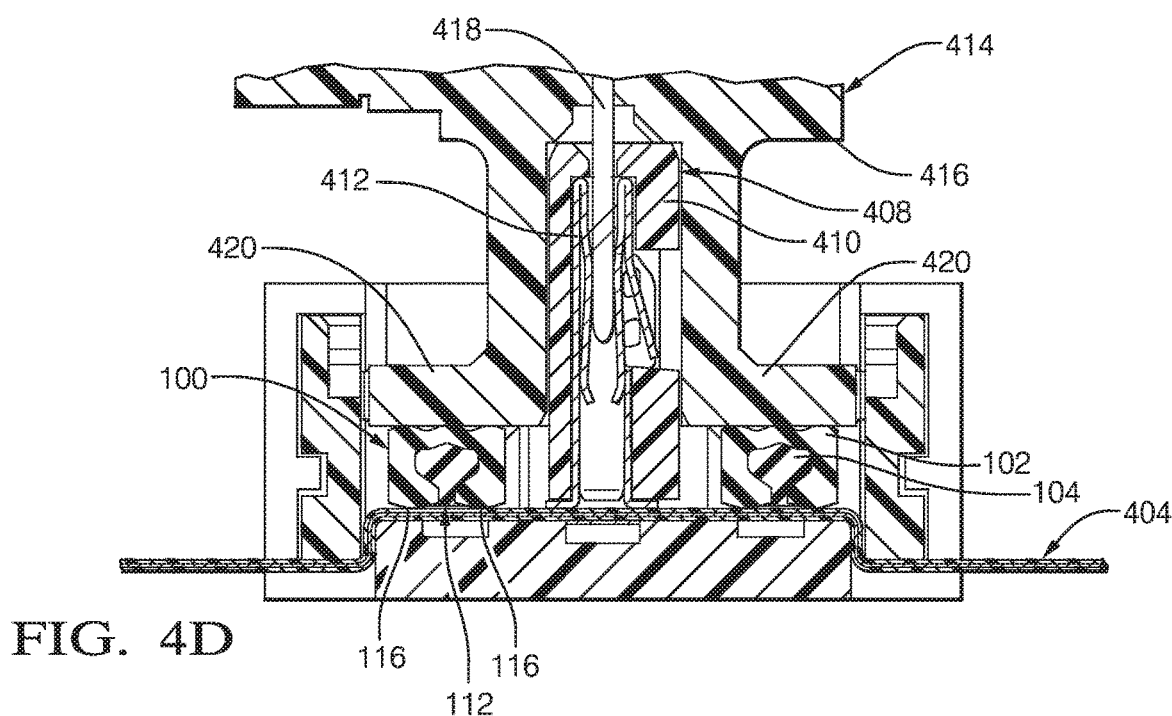

Referring now to FIGS. 4A-4D, the dispensing seal 100 is deployed within a connector assembly 400 according to another embodiment. FIG. 4A is a perspective view and FIG. 4B is a top view of the connector assembly 400, dispensing seal 100 and flexible printed circuit 404. FIGS. 4C and 4D are cross-sectional views of the connector assembly 400 and dispensing seal 100 in an uncompressed state and a compressed state, respectively.

In the embodiment shown in FIGS. 4A and 4B, connector assembly 400 includes connector housing 402, seating cavity 406, and interconnect header 408. Connector assembly 400 provides a terminal for forming electrical contact with the flexible printed circuit 404. As discussed above, one of the features of flexible printed circuit 404 is an uneven top surface caused by the conductive traces associated with the flexible printed circuit 404. In the embodiments shown in FIGS. 4A and 4B, connector housing 402 includes a seating cavity 406 that houses the dispensing seal 100. Interconnect header 408 extends vertically from the flexible printed circuit 404 and is configured to receive a mating connector assembly 414 (shown in FIGS. 4C and 4D) that also interacts with the dispensing seal 100 to compress the dispensing seal 100 against the uneven surface of the flexible printed circuit 404. In particular, FIGS. 4A and 4B illustrate the location of the dispensing seal as surrounding the interconnect header 408 to provide a seal around the periphery of the interconnect header 408.

FIGS. 4C and 4D are cross-sectional views that illustrate connection of a mating connector assembly 414 with the interconnect header 408 and resulting compression of the dispensing seal 100. Mating connector assembly 414 includes shroud 416, mating connector terminal 418, and mating flange 420. Interconnect header 408 includes connector housing 410 and surface mounted terminal 412 configured to receive the mating connector terminal 418. As shown in FIGS. 4C and 4D, dispensing seal 100 is seated within the seating cavity 406 of the connector housing 402. The bottom surface 108 of the dispensing seal 100 is located adjacent to the surface to be sealed—in this case the uneven surface associated with flexible printed circuit 404.

In the embodiment shown in FIG. 4C the dispensing seal is uncompressed. As the mating connector assembly 414 is engaged with the corresponding interconnect header 408, the mating flange 420 compresses the dispensing seal 100 in a vertical direction. As shown in FIG. 4D, in the compressed state the surface ridges 114 and ridges 116 located on the top and bottom surfaces, respectively, of the dispensing seal 100 are compressed. Compressing the dispensing seal 100 includes compressing the second material 104, which results in the less viscous second material 104 dispensing or flowing through the opening 112 into contact with the uneven surface to be sealed. As discussed above, in some embodiments the ridges 116 act to capture or guide the flow of the second material 104 into contact with the flexible printed circuit 404.

As discussed above with respect to FIGS. 3A-3C, the dispensing seal 100 reduces the manufacturing costs associated with the sealing process. The dispensing seal 100 is placed in the seating cavity 406 and the seal is formed by compressing the dispensing seal 100 against the surface to be sealed. For example, other solutions to sealing uneven surfaces associated with flexible printed circuits may include dispensing a sealant around the area to be sealed. However, this requires more expensive dispensing equipment. In addition, removal of the mating connector assembly 400 may result in destruction of the dispensed sealing material. The dispensing seal 100 may be used and re-used, with the second material 104 staying with the dispensing seal 100 even when removed from the after use. In this way, the dispensing seal 100 provides ease of manufacturing/assembling and further allows the dispensing seal 100 to be reused.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are non-exclusive descriptions of possible embodiments of the present invention.

According to one aspect, a dispensing seal includes a base seal comprised of a first material, wherein the base seal has a top surface and a bottom surface and a cavity defined within the base seal. The bottom surface includes an opening to the cavity. The dispensing seal further includes a second material located within the cavity of the base seal, wherein a viscosity of the second material is less than a viscosity of the first material.

The dispensing seal of the preceding paragraph can optionally include, additionally and/or alternatively any, one or more of the following features, configurations, and/or additional components.

For example, in some embodiments the top surface may include one or more surface ridges.

In some embodiments, the cavity may include a distal end and a proximal end.

In some embodiments, the distal end of the cavity may extend into one of the one or more surface ridges and wherein the proximal end is located adjacent the opening to the cavity.

In some embodiments, the proximal end may be narrower than a main region of the cavity.

In some embodiments, the bottom surface may include a first ridge and a second ridge located on either side of the opening to the cavity.

In some embodiments, the dispensing seal may be circular in shape.

In some embodiments, the dispensing seal may be a face seal.

In some embodiments, the second material may be dispensed from the opening in response to a compression force applied between the top surface and the bottom surface.

In some embodiments, the first material may be comprised of a rubber-like material.

In some embodiments, the first material may be comprised of silicone.

In some embodiments, the second material may be dispensed within the cavity of the base seal.

According to another aspect, a sealing assembly includes a housing, a component configured to interact with the housing, and a dispensing seal located between the housing and the surface to be sealed. The dispensing seal includes a base seal having a top surface, a bottom surface, and a cavity formed therein, wherein the cavity opens to the bottom surface of the dispensing seal. A second material is located within the cavity and is dispensed through the cavity opening and into contact with the surface to be sealed in response to compression of the dispensing seal.

The sealing assembly of the preceding paragraph can optionally include, additionally and/or alternatively any, one or more of the following features, configurations, and/or additional components.

For example, in some embodiments the top surface of the dispensing seal may be in contact with the housing and wherein the bottom surface of the dispensing seal may be in contact with the surface to be sealed.

In some embodiments, engagement of the housing with the component causes the dispensing seal to be compressed between the housing and the component.

In some embodiments, the base seal may be comprised of a first material different than the second material.

In some embodiments, wherein a viscosity of the second material is less than a viscosity of the first material.

In some embodiments, the surface to be sealed may be uneven.

In some embodiments, the component may be a flexible printed circuit.

In some embodiments, the bottom surface includes a first ridge and a second ridge located on either side of the opening to the cavity to retain the second material dispensed through the cavity opening.

The invention claimed is:

1. A dispensing seal comprising:
a base seal comprised of a first material, the base seal having at least a top surface and a bottom surface and a cavity defined within the base seal, wherein the bottom surface includes an opening to the cavity; and
a second material located within the cavity of the base seal, wherein a durometer of the second material is less than a durometer of the first material, wherein at least a portion of the second material is forced through the opening in response to a compression force applied between the top surface and the bottom surface,
wherein the top surface includes one or more surface ridges.

2. The dispensing seal of claim 1, wherein the cavity includes a distal end and a proximal end.

3. The dispensing seal of claim 2, wherein the distal end extends into one of the one or more surface ridges and wherein the proximal end is located adjacent the opening to the cavity.

4. The dispensing seal of claim 2, wherein the proximal end is narrower than a main region of the cavity.

5. The dispensing seal of claim 1, wherein the bottom surface includes a first ridge and a second ridge located on either side of the opening to the cavity.

6. The dispensing seal of claim 1, wherein the dispensing seal is circular in shape.

7. The dispensing seal of claim 1, wherein the dispensing seal is a face seal.

8. The dispensing seal of claim 1, wherein the first material is comprised of a rubber-like material.

9. The dispensing seal of claim 8, wherein the first material is silicone.

10. The dispensing seal of claim 1, wherein the second material is dispensed within the cavity of the base seal.

11. The dispending seal of claim 1, further comprising a midpoint halfway between the top surface and the bottom surface, wherein the cavity is disposed across the midpoint.

12. A sealing assembly comprising:
a housing including a seating cavity;
a component configured to interact with the housing, the component having a surface to be sealed relative to the housing; and
a dispensing seal located between the housing and the surface to be sealed, the dispensing seal comprising a base seal having a top surface with one or more surface ridges disposed on the top surface, a bottom surface, and a cavity formed therein, wherein the cavity opens to the bottom surface of the dispensing seal and wherein a second material is located within the cavity and forced through the cavity opening and into contact with the surface to be sealed in response to compression of the one or more ridges disposed on the top surface, wherein the seating cavity provides downward compression to the one or more ridges disposed on the top surface, wherein the base seal is comprised of a first material different than the second material, and wherein the durometer of the second material is less than a durometer of the first material.

13. The sealing assembly of claim 12, wherein the top surface of the dispensing seal is in contact with the housing and wherein the bottom surface of the dispensing seal is in contact with the surface to be sealed.

14. The sealing assembly of claim 13, wherein engagement of the housing with the component causes the dispensing seal to be compressed between the housing and the component.

15. The sealing assembly of claim 12, wherein the surface to be sealed is uneven.

16. The sealing assembly of claim 15, wherein the component is a flexible printed circuit.

17. The sealing assembly of claim 12, wherein the bottom surface includes a first ridge and a second ridge located on either side of the opening to the cavity to retain the second material dispensed through the cavity opening.

18. The sealing assembly of claim 12, wherein the seating cavity includes two side walls.

19. The sealing assembly of claim 12, wherein the cavity includes a distal end and a proximal end, the distal end extending into one of the one or more surface ridges disposed on the top surface.

20. The sealing assembly of claim 12, wherein base seal has a top surface with a plurality of surface ridges disposed on the top surface.

* * * * *